FREDERIC TRIGALET.
Improvement in Hoes.
No. 121,691.   Patented Dec. 5, 1871.
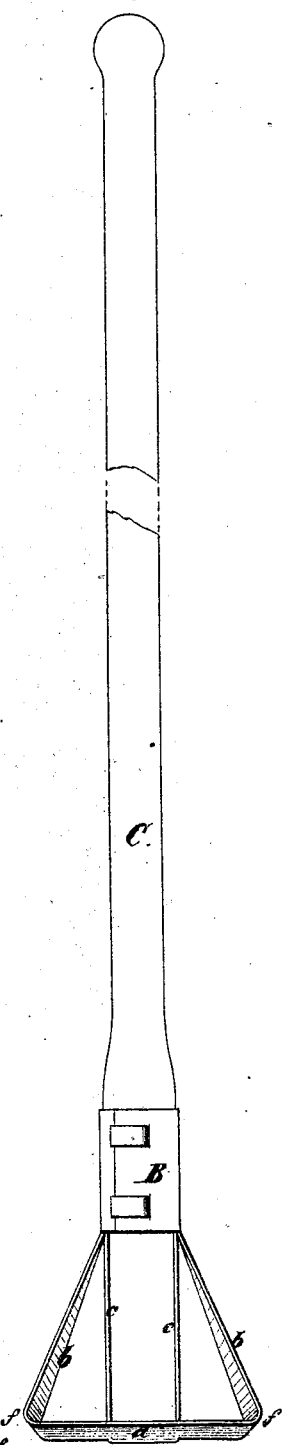
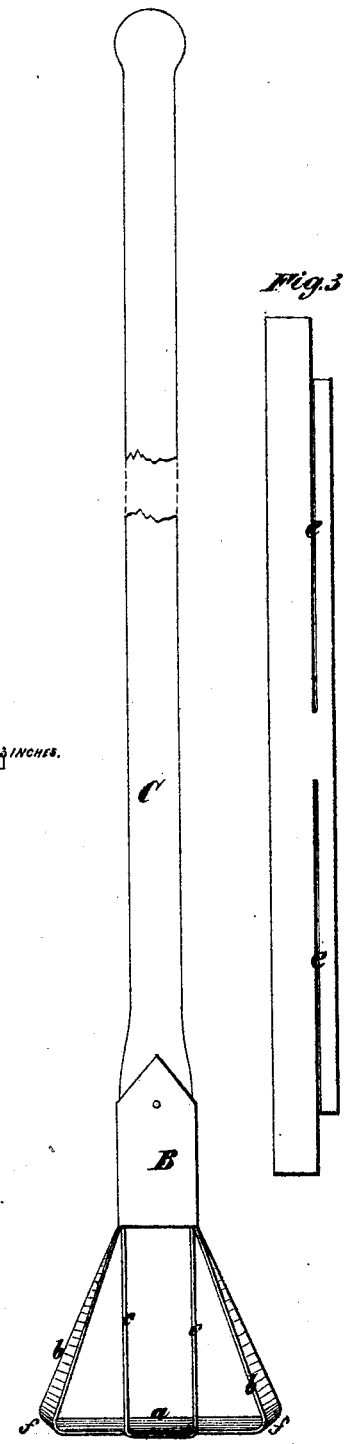
Witnesses.
Frederic Trigalet

UNITED STATES PATENT OFFICE.

FREDERIC TRIGALET, OF ASTORIA, NEW YORK.

IMPROVEMENT IN GARDEN-HOES.

Specification forming part of Letters Patent No. 121,691, dated December 5, 1871.

*To all whom it may concern:*

Be it known that I, FREDERIC TRIGALET, of Astoria, in the county of Queens and State of New York, have invented a new and Improved Hoe; and I do hereby declare that the following is a full, clear, and exact description thereof, reference being had to the accompanying drawing forming part of this specification.

This invention consists in a hoe of novel construction, having, in addition to the ordinary cross-head, two others, which are parallel with each other and with the handle, and two oblique blades, whereby it is made capable of weeding, pulverizing, and raking the ground at one operation.

In the accompanying drawing, Figure 1 is a face view of one side of the hoe. Fig. 2 is a similar view of the other side; and Fig. 3 is a face view of the slit strip of steel-plate of which the head of the hoe is composed.

Similar letters of reference indicate corresponding parts in all three figures.

The head of the hoe is made of a strip of thin steel-plate, slit near one edge, as shown at $e\ e$, in Fig. 3, from each end and nearly to its middle. The broader portions at the corresponding sides of the two slits $e\ e$ are bent at $f\ f$ to form the two oblique side blades $b\ b$, which converge toward the handle, and portions of the cross or end blade, the central portion of the latter being formed by the unslit middle portion of the strip. The side blades $b\ b$ have a lateral inclination as well as a longitudinal convergence. The narrower portions at the other sides of the slits $e\ e$ are bent perpendicularly to the end blade $a$ to form two parallel blades, $c\ c$, which project from the main portion of the hoe. The ends of the said oblique blades $b\ b$ and parallel blades $c\ c$ are fitted into a square socket, B, by which they are secured to the handle C, the end of which is made square to correspond with the said socket. The said ends may be provided with teeth, which by biting into the handle, will serve the more firmly to secure them.

The hoe thus constructed, in addition to its use as an ordinary hoe for breaking the ground, can be used as a rake for pulverizing and raking by simply turning it over and using the side on which the parallel blades $c\ c$ are situated.

The advantages possessed by this hoe are that it can be used as an ordinary weeding-hoe and with equal facility as a prong-hoe; it is so light and handy that it can be used by a lady or child. By means of its several blades it will thoroughly hoe and pulverize the soil, and thereby avoid the necessity for raking it afterward. Having less surface than the ordinary hoe it will encounter less resistance, and therefore requires less strength.

What I claim as my invention, and desire to secure by Letters Patent, is—

The hoe constructed with a cross-blade, $a$, oblique blades $b\ b$, and parallel blades $c\ c$, substantially as and for the purpose herein set forth.

F. TRIGALET.

Witnesses:
   FRED HAYNES,
   R. E. RABEAU.

(141)